United States Patent
Yanagihara et al.

(10) Patent No.: US 10,366,613 B2
(45) Date of Patent: Jul. 30, 2019

(54) PATH PREDICTION DEVICE AND PATH PREDICTION METHOD

(71) Applicant: TOYOTA JIDOSHA KABUSHIKI KAISHA, Toyota-shi, Aichi-ken (JP)

(72) Inventors: Tadashi Yanagihara, Moriya (JP); Kenji Horiguchi, Edogawa-ku (JP); Keisuke Kurihara, Yamato (JP); Chihiro Sannomiya, Yokohama (JP); Atsushi Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 15/401,481

(22) Filed: Jan. 9, 2017

(65) Prior Publication Data

US 2017/0200374 A1 Jul. 13, 2017

(30) Foreign Application Priority Data

Jan. 13, 2016 (JP) .................................. 2016-004753

(51) Int. Cl.
| | |
|---|---|
| *G01C 21/36* | (2006.01) |
| *G08G 1/00* | (2006.01) |
| *G01C 21/20* | (2006.01) |
| *G08G 1/01* | (2006.01) |
| *G08G 1/0968* | (2006.01) |

(Continued)

(52) U.S. Cl.
CPC ............ *G08G 1/20* (2013.01); *G01C 21/20* (2013.01); *G01C 21/36* (2013.01); *G01C 21/3617* (2013.01); *G01S 5/0027* (2013.01); *G01S 19/42* (2013.01); *G08G 1/0112* (2013.01); *G08G 1/0129* (2013.01); *G08G 1/0141* (2013.01); *G08G 1/096822* (2013.01);

(Continued)

(58) Field of Classification Search
CPC ............ G01C 21/3617; G01C 21/3484; G01C 21/20; G01C 21/36; G08G 1/0129; G08G 1/20
USPC .................................................. 701/300, 424
See application file for complete search history.

(56) References Cited

U.S. PATENT DOCUMENTS

2005/0251325 A1 11/2005 Kudo et al.

FOREIGN PATENT DOCUMENTS

| JP | 2009-008684 A | 1/2009 |
|---|---|---|
| JP | 2009-270877 A | 11/2009 |

(Continued)

OTHER PUBLICATIONS

Jon Froehlich et al., "Route Prediction from Triip Observations", 2008, SAE International.

*Primary Examiner* — Nadeem Odeh
(74) *Attorney, Agent, or Firm* — Oliff PLC

(57) ABSTRACT

A path prediction device comprises a storage unit that generates and stores, based on information collected from a plurality of vehicles including a first vehicle, traveling path information indicating information associated with paths where the respective vehicles have traveled; a positional information acquisition unit that acquires a first position indicating the current position of the first vehicle; and a path prediction unit that predicts the traveling path of the first vehicle using at least one of first path information indicating paths of the first vehicle and second path information indicating paths of second vehicles among the traveling path information, wherein the path prediction unit determines a use ratio of the first path information, which is used to predict the traveling path, based on a past traveling record of the first vehicle at the first position.

9 Claims, 11 Drawing Sheets

(51) Int. Cl.
*G01S 19/42* (2010.01)
*G01S 5/00* (2006.01)
*G01S 19/14* (2010.01)

(52) U.S. Cl.
CPC . *G08G 1/096844* (2013.01); *G08G 1/096861* (2013.01); *G01S 19/14* (2013.01)

(56) References Cited

FOREIGN PATENT DOCUMENTS

| | | | |
|---|---|---|---|
| JP | 2010-008284 | A | 1/2010 |
| JP | 2010-267000 | A | 11/2010 |
| JP | 2013-148387 | A | 8/2013 |
| JP | 2015-001471 | A | 1/2015 |
| WO | 2009/157194 | A1 | 12/2009 |

TRAVELING HISTORY INFORMATION

| VEHICLE ID | ACQUISITION DATE/TIME | POSITIONAL INFORMATION |
|---|---|---|
| V1 | 2016/1/1 12:00 | L1 |
| V1 | 2016/1/1 12:01 | L2 |
| V1 | 2016/1/1 12:02 | L3 |
| V1 | 2016/1/1 12:03 | L4 |
| V2 | 2016/1/1 12:00 | L5 |
| V2 | 2016/1/1 12:01 | L6 |
| V2 | 2016/1/1 12:02 | L7 |
| V3 | 2016/1/1 12:00 | L5 |
| V3 | 2016/1/1 12:01 | L6 |
| V3 | 2016/1/1 12:02 | L3 |
| V3 | 2016/1/1 12:03 | L4 |
| ... | ... | ... |

PATH PREDICTION DEVICE AND PATH PREDICTION METHOD

CROSS REFERENCE TO RELATED APPLICATION

This application claims the benefit of Japanese Patent Application No. 2016-004753, filed on Jan. 13, 2016, which is hereby incorporated by reference herein in its entirety.

BACKGROUND OF THE INVENTION

Field of the Invention

The present invention relates to a device that predicts the traveling path of a vehicle.

Description of the Related Art

Technologies for predicting the traveling paths of vehicles using various information have been known. By the prediction of the traveling paths of vehicles in advance, it becomes possible to collect various information on the traveling paths and present the information to drivers.

As such, for example, Japanese Patent Application Laid-open No. 2010-267000 discloses a technology for determining the probability of the passage of each road based on the current position of a vehicle and positional information transmitted from the vehicle in the past and predicting the traveling path of the vehicle.

In addition, Japanese Patent Application Laid-open No. 2010-008284 discloses a technology for extracting the traveling histories of drivers having tendencies similar to those of a target driver based on driver's past traveling histories and questionnaire survey results and predicting the traveling path of a vehicle using the extracted traveling histories.

SUMMARY OF THE INVENTION

A device described in Japanese Patent Application Laid-open No. 2010-267000 is allowed to accurately predict a path since it predicts the path based on its own traveling histories. However, when the device predicts a path based on its own traveling histories, it is not allowed to predict the path in an area in which the vehicle has not traveled in the past.

On the other hand, a device described in Japanese Patent Application Laid-open No. 2010-008284 is allowed to predict a path using the traveling histories of other drivers. However, even when sufficient amounts of its own traveling histories are available as in an area adjacent to a home or the like, the device is not allowed to use the own traveling histories. Therefore, accuracy in the prediction of a path reduces.

In order to solve the above problems, it is necessary to properly use its own traveling histories in an area in which sufficient amounts of the own traveling histories have been stored and the traveling histories of others in an area in which the sufficient amounts of the own traveling histories have not been stored.

The present invention has been made in view of the above problems and has an object of improving accuracy in the prediction of a path.

The present invention in its one aspect provides a path prediction device that predicts a traveling path of a first vehicle based on a current position of the first vehicle, the path prediction device comprising a storage unit configured to generate and store, based on information collected from a plurality of vehicles including the first vehicle, traveling path information indicating information associated with paths where the respective vehicles have traveled; a positional information acquisition unit configured to acquire a first position indicating the current position of the first vehicle; and a path prediction unit configured to predict the traveling path of the first vehicle using at least one of first path information indicating paths of the first vehicle and second path information indicating paths of second vehicles other than the first vehicle among the traveling path information stored in the storage unit, wherein the path prediction unit is configured to determine a use ratio of the first path information, which is used to predict the traveling path, based on a past traveling record of the first vehicle at the first position.

The first vehicle is a vehicle for which a traveling path is to be predicted, and the second vehicles are vehicles other than the first vehicle. In addition, the storage unit is a unit that stores information on paths (traveling path information) where the vehicles have traveled in the past, based on information collected from the first and second vehicles. The traveling path information is typically expressed by the lines of nodes and links corresponding to a road network, but may be expressed in any form as far as paths where the vehicles have traveled in the past are concerned.

The path prediction unit predicts the traveling path of the first vehicle using at least one of information indicating the paths of the first vehicle (first path information) and information indicating the paths of the second vehicles (second path information) among the traveling path information.

In order to accurately predict a traveling path, it is preferable to use information on paths where an own vehicle has traveled in the past (i.e., the first path information). However, when the first vehicle exists in an area in which the own vehicle has not traveled in the past (or in an area in which the number of the traveling times of the own vehicle is small and thus sufficient amounts of information have not been stored), there is a case that a more accurate predicted result may be obtained with the use of information on other vehicles (i.e., the second path information). Therefore, the path prediction device according to the present invention determines the use ratio of the first path information and the second path information based on the past traveling records of the first vehicle at the current position of the first vehicle.

Thus, for example, it becomes possible to predict a traveling path using only path information on other vehicles when an own vehicle exists in an area in which the traveling records of the vehicle are small, and predict the traveling path using only path information on the own vehicle when the own vehicle exists in an area having sufficient amounts of the traveling records of the vehicle. Of course, the mixing ratio of both the path information on the own vehicle and the path information on the other vehicles may be determined based on traveling records.

Also, the storage unit may be configured to store the number of traveling times of the first vehicle at a plurality of local areas, and the path prediction unit may be configured to determine the use ratio of the first path information based on the number of traveling times of the first vehicle at a local area corresponding to the first position.

For example, the storage unit may store the number of the traveling times of the first vehicle in units of areas divided by grids or may store the number of the traveling times of the first vehicle in units of links or sections corresponding to a road. Like this, the local area may be in any unit so long as it is possible to associate the first position and the number of the traveling times of the vehicle with each other.

Also, the path prediction unit may include a first unit configured to assign scores to the plurality of local areas based on the number of the traveling times of the first vehicle in a past at the plurality of local areas; and a second unit configured to predict the traveling path using the scores.

When the path is predicted, a score corresponding to the number of the traveling times of the first vehicle in the past may be assigned to the local area. For example, when the first vehicle exists in an area assigned a higher score, the first path information may be used more frequently.

Also, the first unit may be configured to divide the plurality of local areas into a first area assigned a score less than a prescribed threshold and a second area assigned a score greater than or equal to the prescribed threshold, and the second unit may be configured to predict the traveling path without using the second path information when the first position is included in the second area.

Like this, areas may be divided into two areas based on traveling records. That is, the first area is an area having no sufficient amounts of traveling records, and the second area is an area having sufficient amounts of traveling records. When the local areas are divided like this, the path is predicted using only the first path information in the second area. As a result, a more accurate prediction result may be obtained.

Also, the first unit may be configured to expand the second area after dividing the plurality of local areas.

When areas are divided in units of local areas, there is a case that areas having no traveling records are interspersed in a state of being surrounded by areas having traveling records. For example, when adjacent areas have traveling records even if a certain area has no traveling records, there is a case that it is preferable to perform processing with the assumption that the certain area has traveling records.

For example, when the local areas are grids, the second area may be expanded up to squares adjacent in four directions (or eight directions). When the local areas are load links (sections), the second area may be expanded by a prescribed number with respect to adjacent links (sections). In addition, the expansion range of the second area may be one or more squares (one or more links or sections).

Also, the second unit may be configured to increase the use ratio of the first path information as a score assigned to the local area corresponding to the first region is higher.

Also, the traveling path information may indicate information in which a source link where the vehicles have moved out, a destination link where the vehicles have moved in, and the number of the vehicles having moved out from the source link and having moved in the destination link are recorded for each of branched parts of the links in a road network constituted by the links, and the second unit may be configured to predict one or more traveling paths based on the number of the vehicles moving between the links.

For example, when four links are joined to each other at an intersection, the number of vehicles having moved out from one link and having moved in the other three links is recorded for each of the links. By using such information, it is possible to determine a next link where a vehicle having moved out from a certain link travels with the highest probability at a branch and use the same to predict a path. Note that it may be possible to predict one or more traveling paths.

Also, the second unit may be configured to predict the traveling path by calculating a probability at which the vehicles move in for each of the destination links based on the number of the vehicles having moved between the links at the branched parts of the links and sequentially tracing, from the first position, links where the vehicles move in with a highest probability.

Like this, the predicted path may be generated by tracing the links where the first vehicle travels with a higher probability for each generated branch.

Also, the second unit may be configured to determine whether to branch the predicted path subsequent to a concerned link based on a variation in a plurality of calculated probabilities.

When the variation in the probabilities at which the vehicles move in each of the links is low, probabilities having similar values are associated with the plurality of links, which indicates that the prediction of subsequent paths with high accuracy is not allowed. Accordingly, in such a case, the predicted path may be branched (i.e., a plurality of predicted paths may be generated).

Note that the present invention may be specified as a path prediction device including at least some of the above units. In addition, the present invention may also be specified as a path prediction method performed by the path prediction device. The above processing and units may be freely combined together and carried out so long as no technical contradictions arise.

According to an embodiment of the present invention, it is possible to improve accuracy in the prediction of a path.

BRIEF DESCRIPTION OF THE DRAWINGS

FIG. 3 shows an example of a traveling history table;

DESCRIPTION OF THE EMBODIMENTS

First Embodiment (System Configuration)

Hereinafter, a description will be given of the preferred embodiments of the present invention with reference to the drawings.

A path prediction system according to a first embodiment is a system that stores information on paths where a plurality of vehicles has traveled in the past and predicts, when receiving a request from a vehicle (hereinafter called a prediction target vehicle), a path where the vehicle will travel in the future based on the current position of the vehicle.

Figure 1:
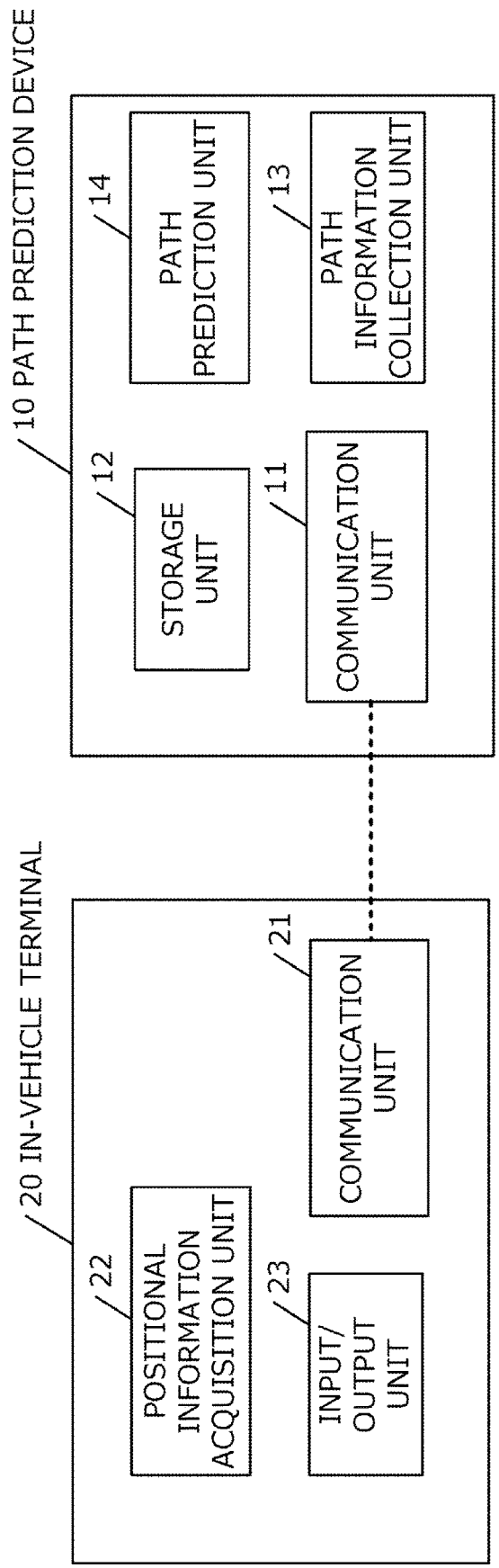
FIG. 1 is a system configuration diagram of a path prediction system according to a first embodiment.

FIG. 1 is a system configuration diagram of the path prediction system according to the embodiment.

The path prediction system according to the embodiment is constituted by a path prediction device 10 and an in-vehicle terminal 20.

In addition, the path prediction system according to the embodiment performs (1) a first phase in which the path prediction device 10 periodically collects current positions from a plurality of in-vehicle terminals 20 and generates and stores information on the traveling paths of vehicles (hereinafter called traveling path information) based on the collected current positions, and (2) a second phase in which the path prediction device 10 acquires a current position from a prediction target vehicle (in-vehicle terminal 20) and returns a prediction result after predicting a traveling path.

First, a description will be given of the path prediction device 10. The path prediction device 10 is constituted by a communication unit 11, a storage unit 12, a path information collection unit 13, and a path prediction unit 14.

The communication unit 11 is a unit that accesses a network via a communication line (for example, a mobile telephone network) to communicate with the in-vehicle terminal 20.

The storage unit 12 is a unit that stores information necessary for the operation of the device. In the embodiment, the storage unit 12 stores the three types of information, i.e., (1) map information, (2) traveling history information, and (3) traveling path information.

A description will be given of each data.

Figure 2:
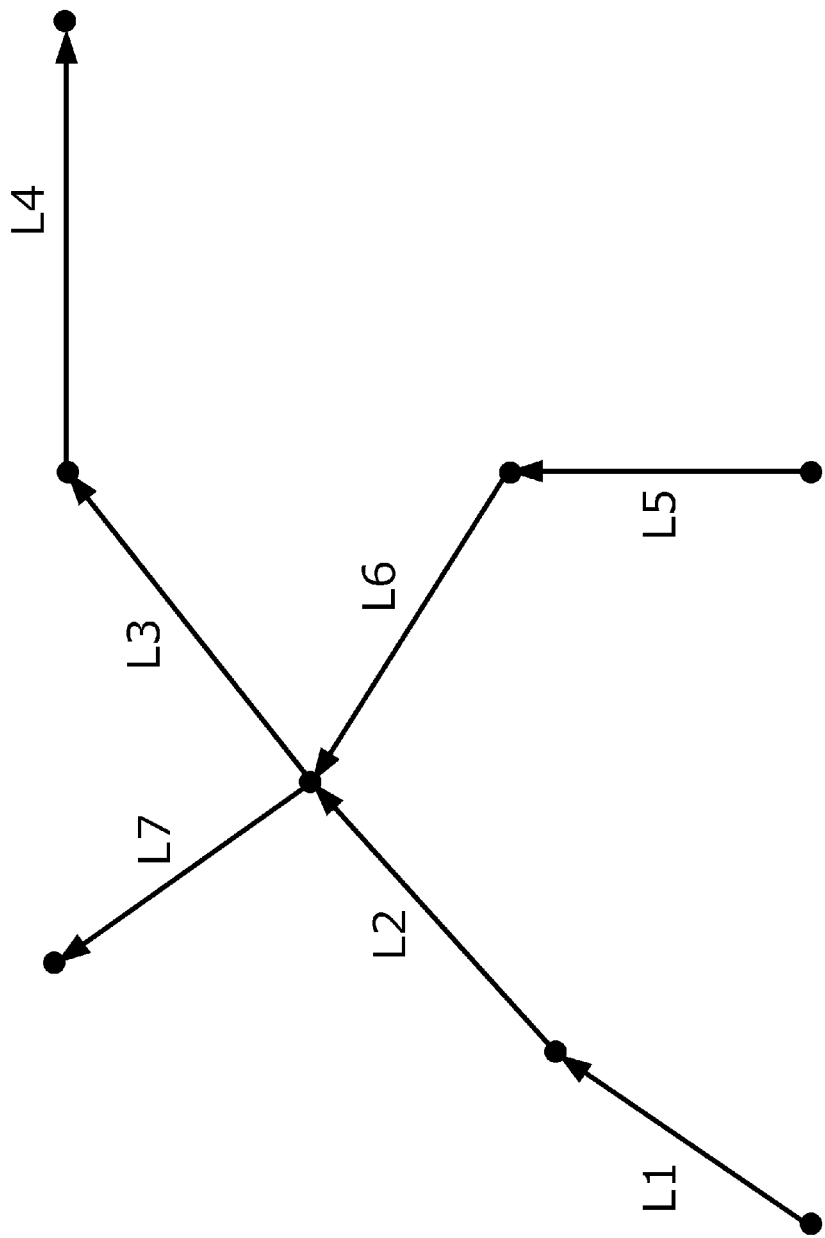
FIG. 2 shows an example in which the connecting relationships between roads are expressed by links and nodes.

The map information includes road map data in which information on roads where vehicles are allowed to travel is defined, i.e., data in which the connecting relationships between the roads are expressed by links and nodes. FIG. 2 shows an example in which the connecting relationships between roads are expressed by links and nodes. Note that in the embodiment, different identifiers are assigned to links depending on moving directions even in the same roads (FIG. 2 shows only one-way directions).

The traveling history information includes the histories of positional information collected from vehicles. In the embodiment, vehicle IDs, acquisition dates/times, and positional information are managed in a table form shown in FIG. 3. Note that the positional information may be in any form so long as the specification of the traveling positions of vehicles is made possible. For example, GPS coordinates (latitudes and longitudes), hash values, the IDs of links corresponding to roads, or the like may be used as such. In the example of FIG. 3, the IDs of links are used as the positional information.

Figure 4:
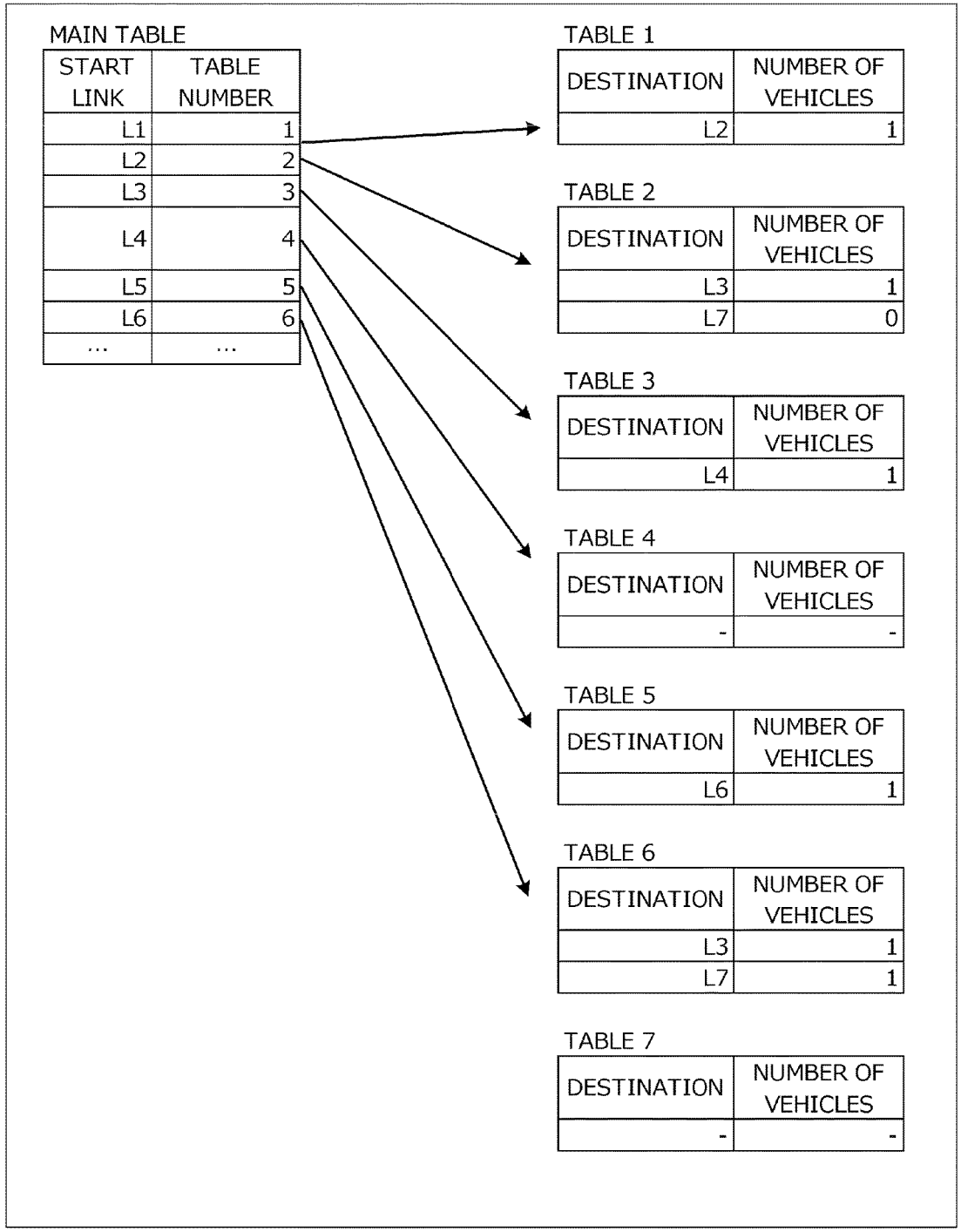
FIG. 4 shows an example of traveling path information.

The traveling path information includes information on paths where a plurality of vehicles has traveled in the past. In the embodiment, as shown in FIG. 4, the traveling path information includes data in which the number of vehicles having moved to links at nodes from which branches are generated is recorded for each of the links.

Figure 5:
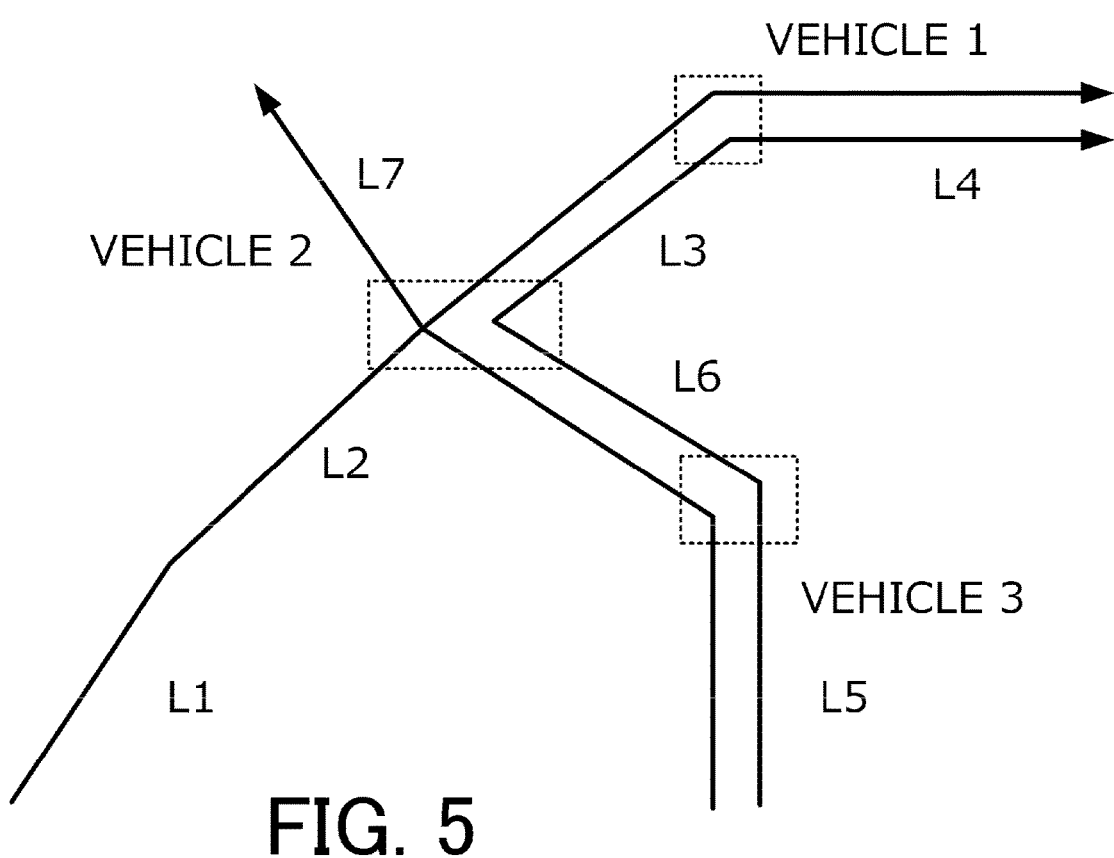
FIG. 5 is a diagram showing an example of paths where a plurality of vehicles has traveled.

For example, in a network shown in FIG. 2, it is assumed that three vehicles have traveled along paths as shown in FIG. 5 (dotted lines indicate the ranges of the same nodes). Here, when attention is paid to a link L2 (table 2), it is found that all the vehicles have moved to a link L3. In addition, when attention is paid to a link L6 (table 6), it is found that one vehicle has moved to the link L3 and one vehicle has moved to a link L7. The traveling path information is generated based on the traveling history information.

The path information collection unit 13 is a unit that generates or updates, based on traveling history information collected from a plurality of in-vehicle terminals 20, traveling path information corresponding to the plurality of vehicles. Specifically, the path information collection unit 13 performs the processing of periodically collecting positional information from a target vehicle, specifying a link where the vehicle exists by identifying the collected positional information with the map information stored in the storage unit 12, acquiring the movement of the vehicle between links in chronological order, and adding a record to the traveling history information.

Note that the reflection of the record on the traveling history information is performed in units of trips. The trip indicates the unit of a period from the start to the end of vehicle's traveling. The trip may be regarded as a period from the start to the end of an engine or may be regarded as a period until a prescribed time elapses after the vehicle stops since the start of its movement.

The path prediction unit 14 is a unit that predicts a path where a prediction target vehicle will travel, based on a current position acquired from the prediction target vehicle and the information stored in the storage unit 12. A specific processing content will be described later.

Next, a description will be given of the in-vehicle terminal 20.

The in-vehicle terminal 20 is a terminal that is installed in a vehicle and communicates with the path prediction device 10.

The communication unit 21 is a unit that accesses a network via a communication line to communicate with the path prediction device 10. The communication unit 21 may use the same protocol and communication system as those of the communication unit 11.

A positional information acquisition unit 22 is a unit that acquires the current position (latitude and longitude) of the in-vehicle terminal 20 from a GPS module (not shown) provided in the device.

An input/output unit 23 is a unit that receives an input operation by a user and presents information to the user. In the embodiment, the input/output unit 23 is constituted by a touch panel display. That is, the input/output unit 23 is constituted by a liquid crystal display and its control unit and constituted by a touch panel and its control unit.

Each of the path prediction device 10 and the in-vehicle terminal 20 may be constituted as an information processing device having a CPU, a main storage unit, and a sub-storage unit. When a program stored in the sub-storage unit is loaded into the main storage unit and then performed by the CPU, each of the units shown in FIG. 1 functions. Note that all or some of the functions shown in FIG. 1 may be performed by an exclusively-designed circuit.

Next, a description will be given of a specific processing content in each of the phases.

Figure 6:
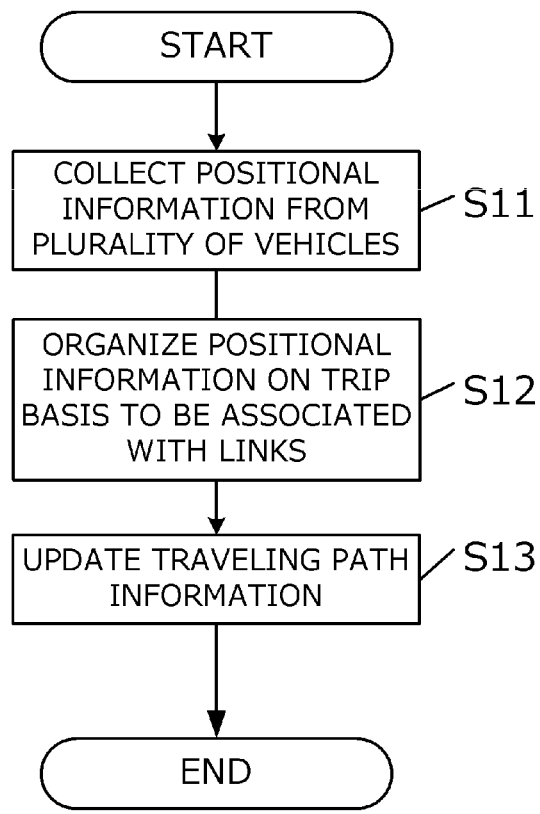
FIG. 6 is a flowchart showing processing performed in a first phase.

The first phase is a phase in which the path prediction device 10 periodically collects current positions from a plurality of in-vehicle terminals 20 to generate (update) traveling path information. FIG. 6 is a flowchart showing processing performed by the path prediction device 10 in the first phase.

First, in step S11, the path prediction device 10 periodically collects positional information from in-vehicle terminals 20 installed in a plurality of vehicles. Thus, the positional information acquired by the in-vehicle terminals 20 (the positional information acquisition units 22) is transmitted to the path prediction device 10 via a communication line.

In step S12, first, the path prediction device 10 organizes the collected positional information in units of trips. For example, the trip may be defined as a period from the ON to the OFF of the power supplies of the in-vehicle terminals 20 or may be defined as a period from the start to the end of the engines of the in-vehicle terminals 20. Alternatively, the trip may be defined as a period until a prescribed time elapses after the vehicles stop since the starts of their movements.

Next, while referring to the map information stored in the storage unit 12, the path prediction device 10 associates the plurality of positional information included for each trip with links. As a result, link lines corresponding to roads where the vehicles have traveled are obtained in units of trips. The obtained information is added to the traveling history information of the storage unit 12.

In step S13, the path prediction device 10 updates the traveling path information stored in the storage unit 12 using the information acquired in step S12. That is, the path prediction device 10 sequentially extracts tables corresponding to links where the vehicles have traveled, and adds the number of the vehicles to the tables according to destinations. For example, when a link line from a link L2 to a link L4 via a link L3 is obtained, 1 is added to a "destination L3" of the table 2 and 1 is added to a "destination L4" of the table 3.

Next, a description will be given of the second phase.

Figure 7:
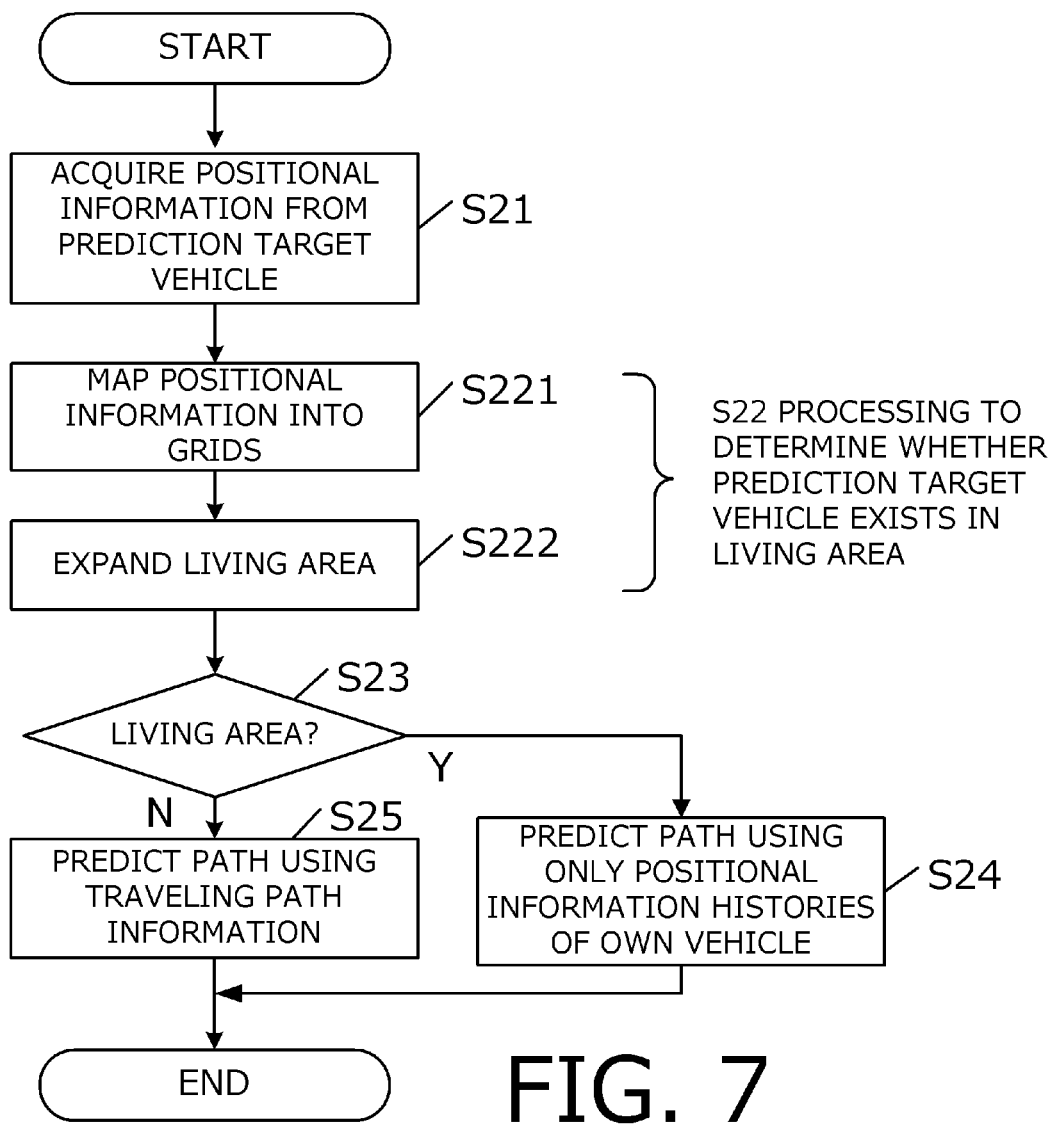
FIG. 7 is a flowchart showing processing performed in a second phase.

The second phase is a phase in which the path prediction device 10 predicts, based on a request received from a prediction target vehicle, the traveling path of the vehicle. FIG. 7 is a flowchart showing processing performed by the path prediction device 10 in the second phase. The processing shown in FIG. 7 starts when the path prediction device 10 receives a request for path prediction from a prediction target vehicle. The request for path prediction may be periodically transmitted from the prediction target vehicle.

First, in step S21, the path prediction device 10 acquires positional information from a prediction target vehicle. Note that GPS coordinates are typically acquired as the positional information, but other types of information such as a hash value indicating the positional information and a link ID corresponding to a road may be acquired.

Step S22 (S221 and S222) is processing in which a determination is made as to whether the acquired positional information is included in the living area of the prediction target vehicle. Note that in the embodiment, an area storing plenty of traveling histories enough to independently predict a path using only the past traveling histories of a vehicle when path prediction for the vehicle is performed is defined as the "living area" of the vehicle.

A description will be given of a method for determining the living area of the prediction target vehicle.

Figure 8:
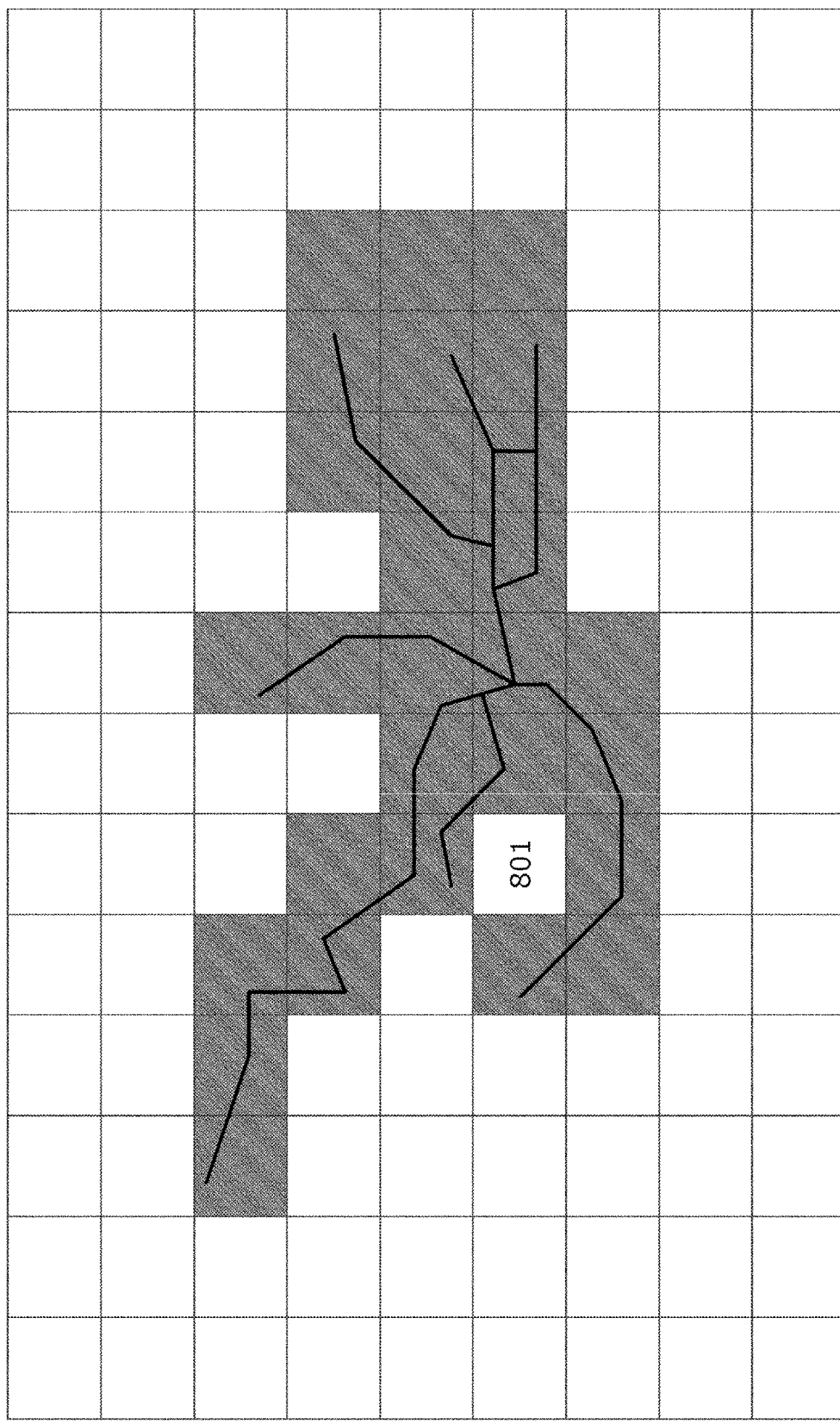
FIG. 8 is a diagram for describing a method for determining a living area.

First, in step S221, the path prediction device 10 extracts traveling histories corresponding to the prediction target vehicle from traveling history information and maps the extracted traveling histories into grids. Note here that the traveling history information is the aggregate of links corresponding to roads. As a result, as shown in FIG. 8, an area is divided into an area in which the vehicle has traveled in the past and an area in which the vehicle has not traveled in the past (a hatched area is the area in which the vehicle has traveled in the past, i.e., the living area). Note that information on the grids may be stored in the storage unit 12 together with map information or may be generated according to a rule. In the embodiment, information obtained by converting GPS coordinates into hash values is used.

Note that in this example, the path prediction device 10 determines that an area in which the vehicle has ever traveled even once is determined to be the living area. However, with a threshold set in the number of traveling times, an area may be handled as the living area when the vehicle has traveled the area by the number of times exceeding the threshold.

Note that when the living area is determined according to the above method, there is a case that an area is determined to be outside the living area depending on the size of the grids although the vehicle travels near the living area (for example, an area indicated by symbol 801 in FIG. 8). In order to prevent the problem, the path prediction device 10 may perform the processing of expanding the living area set in step S221.

Figure 9:
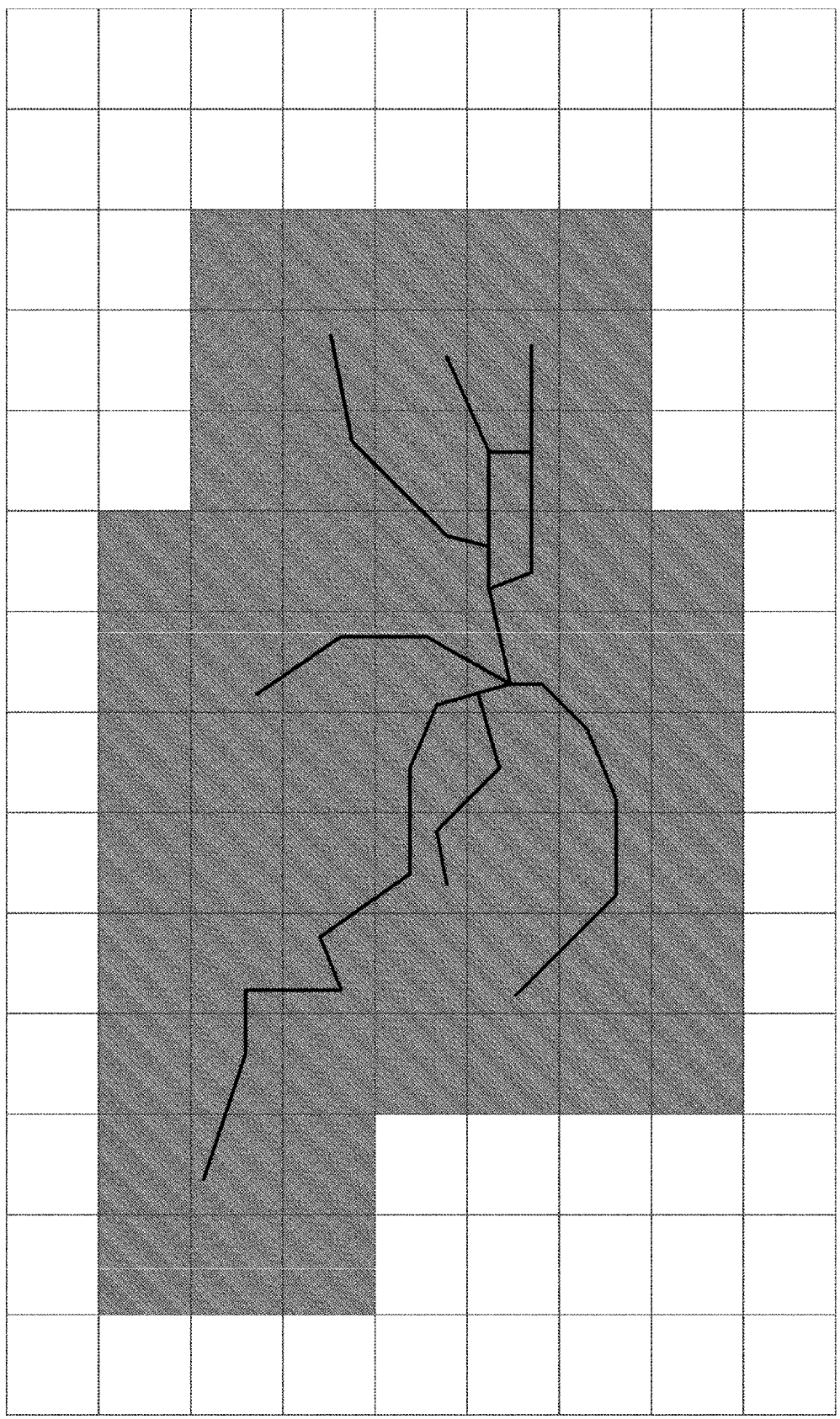
FIG. 9 is a diagram for describing the method for determining the living area.

In the embodiment, the path prediction device 10 performs the processing of handling, as the living area, even eight areas adjacent to the area determined to fall within the living area in step S221 (step S222). As a result, a hatched area shown in FIG. 9 is set as the living area.

After completing the setting of the living area, the path prediction device 10 determines whether the positional information acquired from the prediction target vehicle falls within the living area of the vehicle in step S23. For example, the path prediction device 10 acquires a hash value corresponding to the acquired positional information and compares the acquired hash value with a list of the hash values acquired in step S221. In this case, when the corresponding hash value is included in the list of the hash values, the path prediction device 10 may determine that the acquired positional information falls within the living area.

When it is determined in step S23 that the prediction target vehicle exists in the living area, the path prediction device 10 predicts a path using only the traveling histories of the prediction target vehicle (step S24). Since a known technology may be used as a prediction method in step S24, a detailed description of the prediction method will be omitted.

When it is determined that the prediction target vehicle does not exist in the living area, the path prediction device 10 predicts a path using the traveling path information stored in the storage unit 12 (step S25). As described above, the traveling path information is information in which the moving histories of all the vehicles including the prediction target vehicle are recorded.

Figure 10:
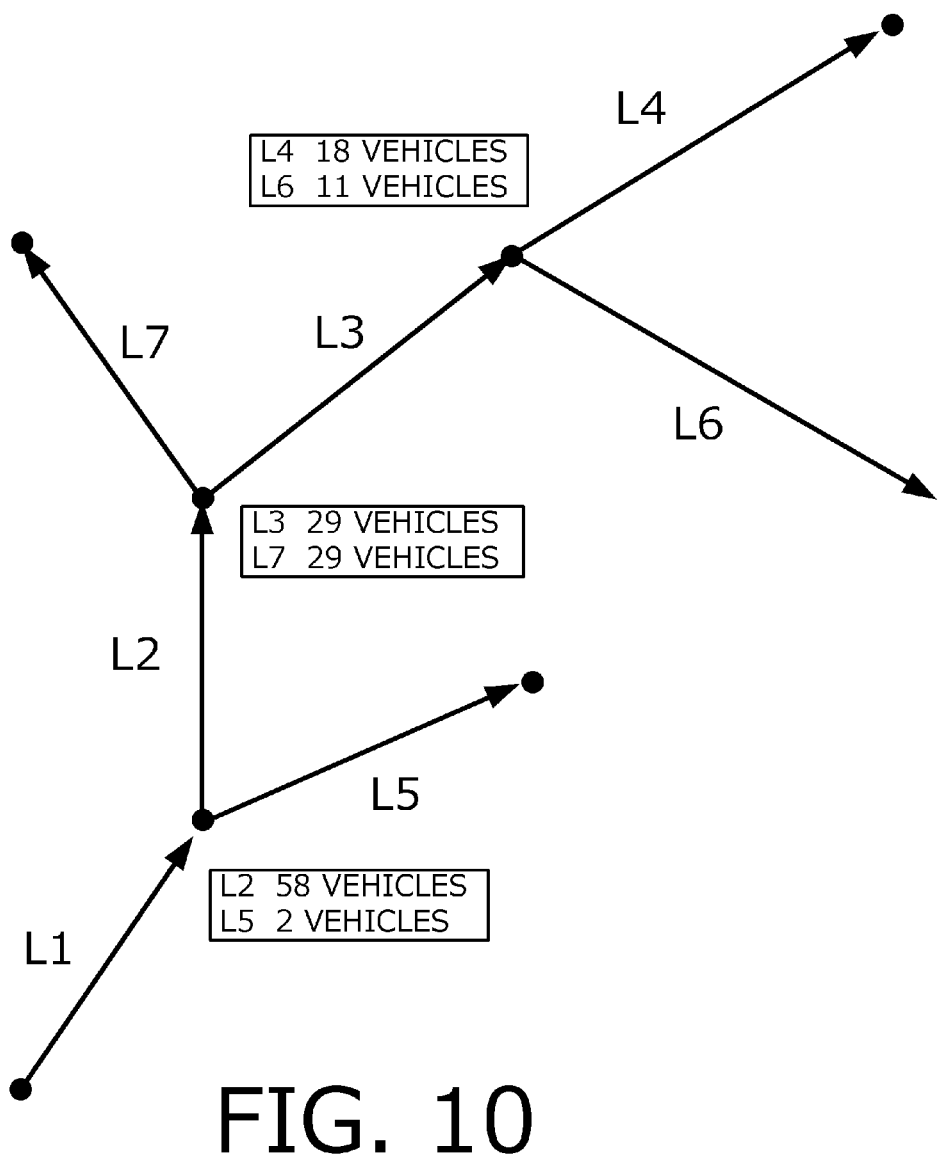
FIG. 10 is a diagram for describing the prediction of a moving direction in the first embodiment.

A description will be given of a specific prediction method performed in step S25 using a road network shown in FIG. 10 as an example.

First, the path prediction device 10 refers to the map information stored in the storage unit 12 to acquire a link ID corresponding to the positional information acquired from the prediction target vehicle. In the example, it is assumed that a link L1 is extracted as the current position of the prediction target vehicle.

Next, the path prediction device 10 refers to the traveling path information to acquire the number of vehicles having traveled from the link L1 to other links. Here, as shown in FIG. 10, it is assumed that 58 vehicles have traveled from the link L1 to a link L2 in the past and 2 vehicles have traveled from the link L1 to a link L5 in the past.

In the embodiment, a moving direction at a branch is determined according to a biased degree calculated from the traveling path information. As a typical scale to express the biased degree, an average information amount (average entropy) is available. Here, when links X and Y exist and vehicles move to each of the links, an average entropy H (X, Y) may be expressed by the following formula (1).

[Math. 1]

$$H(X, Y) = -\sum_{x,y} Pr(X = x, Y = y) \log Pr(X = x, Y = y) \quad \text{Expression (1)}$$

The smaller the value of the average entropy, the greater the biased degree of information is. That is, as a value obtained here is smaller, the number of the vehicles moving to the links X and Y is biased to a greater extent. Accordingly, with a threshold set in the average entropy, it is assumed that, when H calculated for each branch is smaller than the threshold, a prediction target vehicle moves to a link where a greater number of vehicles have traveled in the past. Here, with the threshold set at 0.3, the average entropy when the prediction target vehicle moves out from the link L1 becomes 0.00163. Accordingly, the path prediction device 10 generates a predicted path (from the link L1 to the link L2) with the assumption that the prediction target vehicle moves to the link where a greater number of vehicles have traveled in the past, i.e., the link L2.

On the other hand, the average entropy when the prediction target vehicle moves out from the link L2 is 0.5. That is, since the average entropy exceeds the threshold, the path prediction device 10 is not allowed to specify to which way the vehicle moves. Accordingly, the path prediction device 10 generates two predicted paths, i.e., a predicted path to move to a link L7 and a predicted path to move to a link L3. That is, the following two paths are generated.

Predicted Path 1: Link L1→Link L2→Link L3
Predicted Path 2: Link L1→Link L2→Link L7

When the link L3 and the subsequent links are calculated in the same way, the following two predicted paths are finally obtained.

Predicted Path 1: Link L1→Link L2→Link L3→Link L4
Predicted Path 2: Link L1→Link L2→Link L7

In the example, the path prediction device 10 transmits the two predicted paths 1 and 2 to the in-vehicle terminal 20 as predicted results. In addition, the in-vehicle terminal 20 may generate navigation information using the predicted results and present the generated navigation information to a driver via the input/output unit 23.

Note that the final destination of the vehicle may not be necessarily included in a predicted path. In addition, since a longer distance results in reduction in prediction accuracy, prediction may be cancelled when the length of a path exceeds a prescribed length or when the total number of predicted paths exceeds a prescribed number. Moreover, a traveling probability corresponding to an entire predicted path may be calculated. In this case, when the probability is below a prescribed value, prediction may be cancelled.

Further, although the average entropy is used in the example as a scale to express a biased degree, a variance value may be used. In the case of the example of FIG. 10, the variance when the vehicle moves out from the link L1 is 784, the variance when the vehicle moves out from the link L2 is 0, and the variance when the vehicle moves out from the link L3 is 12.25. In this case as well, the variance of the number of vehicles may be calculated for each of the branches. When a resultant value is less than or equal to a threshold, it is determined that no bias exists and thus the number of predicted paths may be increased.

Similarly, the sum of the squares of probabilities or the like may be used. In the case of the example of FIG. 10, the probability at which the vehicle moves from the link L1 to the link L2 is 58/60, and the probability at which the vehicle moves from the link L1 to the link L5 is 2/60. Each of the values may be squared and added to each other and compared with a threshold. In this case as well, like the variance, it is determined that no bias exists when a resultant value is less than or equal to a threshold and thus the number of predicted paths may be increased.

Note that although the threshold is fixed in the embodiment, a threshold at which the greatest number of appropriate solutions is obtained may be acquired by learning using, for example, a predicted result and a solution.

As described above, the path prediction device according to the first embodiment predicts a path using only information collected from a prediction target vehicle when the prediction target vehicle exists in a living area, and predicts the path using information collected from all vehicles when the prediction target vehicle does not exist in the living area. That is, since the path prediction device predicts a path using only the histories of an own vehicle in an area in which sufficient amounts of traveling histories have been stored, it is allowed to improve prediction accuracy. Besides, since the path prediction device predicts a path using the histories of other vehicles, it is allowed to reliably obtain a predicted result.

Second Embodiment

In the first embodiment, the path prediction device 10 determines whether to predict a path using only the traveling histories of an own vehicle or predict the path using the traveling histories of other vehicles as well, based on whether the prediction target vehicle exists in a living area. Conversely, in a second embodiment, it is possible to change the use ratio of each history.

The second embodiment differs from the first embodiment in that (1) the processing of step S13 is not performed in advance, (2) traveling path information is generated as occasion demands after a request is received from a prediction target vehicle, and (3) two types of traveling path information, i.e., traveling path information generated using only information corresponding to an own vehicle and traveling path information generated using only information corresponding to other vehicles are generated when the traveling path information is generated.

In the second embodiment, instead of a determination as to whether a vehicle exists in a living area, the path prediction device 10 assigns a score to each area based on a past traveling frequency and then determines the use ratio of the two types of traveling path information based on the score. The score may be, for example, a normalized value of 0 to 100.

Here, when it is assumed that the use ratio of the traveling path information corresponding to other vehicles is defined as an "other-vehicles use ratio," the other-vehicles use ratio may be set at 100% (that is, the traveling histories of an own vehicle are not used) when the score is, for example, 0 and may be set at 0% (that is, the traveling histories of other vehicles are not used) when the score is, for example, 100.

Figure 11:
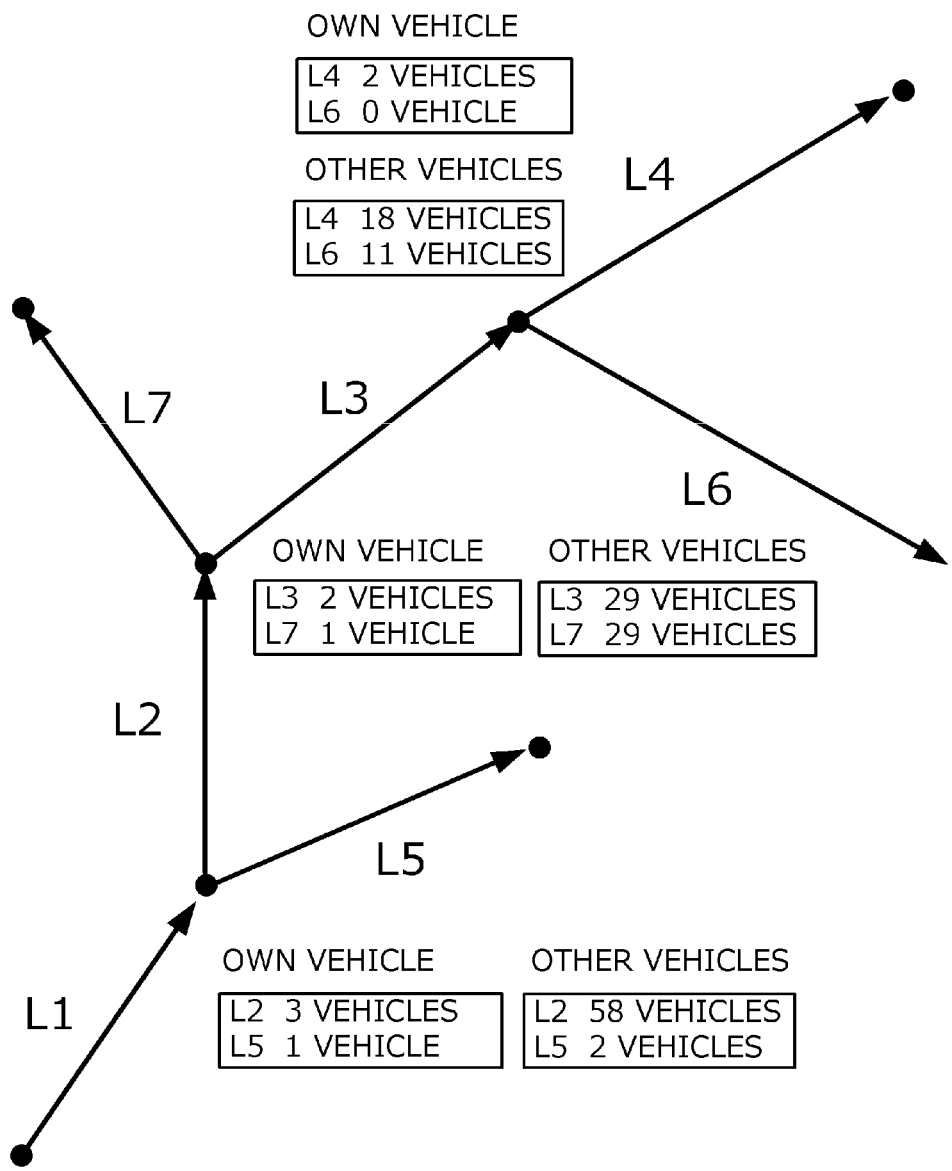
FIG. 11 is a diagram for describing the prediction of a moving direction in a second embodiment.

In the second embodiment, in step S25, the path prediction device 10 generates a predicted path based on the other-vehicles use ratio. FIG. 11 shows the moving destinations between links for each of own vehicles and other vehicles. For example, when the path prediction device 10 weights the number of own vehicles and other vehicles according to the other-vehicles use ratio and then performs the same processing as that of the first embodiment, it is allowed to obtain a predicted result reflecting the other-vehicles use ratio.

Modified Example

Each of the above embodiments is just an example, and the present invention may be appropriately modified and carried out without departing from its scope.

For example, in the description of the above embodiments, information indicating the movements of vehicles from links to links is defined as the traveling path information. However, information on the movements of vehicles from links to nodes or from nodes to links may be used.

In addition, landmarks other than links or nodes may be defined to use information indicating the movements of vehicles between the landmarks and the links (or the nodes). For example, when a vehicle exists in a link, a probability at which the vehicle moves to a landmark (a shop, a public facility, a home or the like) near the link may be calculated and used in combination with the illustrated method to predict a path. For example, when a probability at which a vehicle moves to a commercial facility located midway through a link L1 is greater than a probability at which the vehicle moves from the link L1 to a link L2, a predicted path in which the commercial facility is set as a destination may be generated. Thus, it is possible to converge the predicted path.

Moreover, the landmark may be abstracted information. For example, when the landmark is defined as a "home," a "working place," or the like, it may be possible that data, in which a probability at which a vehicle departing from a home moves to a destination (a link, a node, a landmark, or the like) or the like is defined, is generated and a path is predicted in combination with the data. However, since there is a likelihood that accuracy in the prediction of a path reduces when a range abstracted under the same rule is too broad, it is preferable to perform abstraction for each area having a certain size (for example, a "home at xxx-city, Tokyo").

Further, in the description of the embodiments, the path prediction system is constituted by the in-vehicle terminal and the path prediction device. However, distributed processing is not necessarily performed. For example, the in-vehicle terminal may have the illustrated functions and acquire necessary data via a network to perform processing independently.

Furthermore, in the description of the embodiments, a predicted path is directly transmitted to the in-vehicle terminal 20. However, the predicted path may be transmitted to other devices, and information corresponding to the predicted path may be further acquired and then transmitted to the in-vehicle terminal 20.

What is claimed is:

1. A path prediction device that predicts a traveling path of a first vehicle based on a current position of the first vehicle, the path prediction device comprising:
    a storage unit configured to store, based on information collected from a plurality of vehicles including the first vehicle, traveling path information indicating information associated with paths where the respective vehicles have traveled, and is configured to store the number of traveling times of the first vehicle at a plurality of local areas; and
    a processor configured to perform the functions of:
        a positional information acquisition unit that acquires a first position indicating the current position of the first vehicle; and
        a path prediction unit that predicts the traveling path of the first vehicle based on a use ratio of first path information indicating paths of the first vehicle and second path information indicating paths of second vehicles other than the first vehicle among the traveling path information stored in the storage unit, wherein
    the processor is further configured to:
        determine an amount of the first path information used in the use ratio, which is used to predict the traveling path, based on a past traveling record of the first vehicle at the first position, and
        set the amount of the first path information used in the use ratio used for predicting the traveling path to be higher as the number of traveling times of the first vehicle at a local area corresponding to the first position becomes larger.

2. The path prediction device according to claim 1, wherein the processor is further configured to:
    assign scores to the plurality of local areas based on the number of the traveling times of the first vehicle in a past at the plurality of local areas; and
    predict the traveling path by determining the amount of the first path information used in the use ratio based on the scores.

3. The path prediction device according to claim 2, wherein
    the processor is further configured:
        to divide the plurality of local areas into a first area assigned a score less than a prescribed threshold and a second area assigned a score greater than or equal to the prescribed threshold, and
        to predict the traveling path without using the second path information when the first position is included in the second area.

4. The path prediction device according to claim 3, wherein
    the processor is further configured to expand the second area after dividing the plurality of local areas.

5. The path prediction device according to claim 2, wherein
    the processor is further configured to increase the amount of the first path information used in the use ratio as a score assigned to the local area corresponding to the first position is higher.

6. The path prediction device according to claim 2, wherein
    the traveling path information indicates information in which a source link where at least one of the first vehicle and the second vehicles have moved out, a destination link where at least one of the first vehicle and the second vehicles have moved in, and the number of the at least one of the first vehicle and the second vehicles having moved out from the source link and having moved in the destination link are recorded for each of branched parts of the links in a road network constituted by the links, and
    the processor is further configured to predict one or more traveling paths based on the number of the vehicles moving between the links.

7. The path prediction device according to claim 6, wherein
    the processor is further configured to predict the traveling path by calculating a probability at which at least one of the first vehicle and the second vehicles move in for each of the destination links based on the number of the at least one of the first vehicle and the second vehicles having moved between the links at the branched parts of the links and sequentially tracing, from the first position, links where the at least one of the first vehicle and the second vehicles move in with a highest probability.

8. The path prediction device according to claim 7, wherein the processor is further configured to determine whether to branch the predicted path subsequent to a concerned link based on a variation in a plurality of calculated probabilities.

9. A path prediction method performed by a path prediction device that predicts a traveling path of a first vehicle based on a current position of the first vehicle, the path prediction method comprising:

generating, based on information collected from a plurality of vehicles including the first vehicle, traveling path information indicating information associated with paths where the respective vehicles have traveled,
wherein the information comprises a number of traveling times of the first vehicle at a plurality of local areas;

acquiring a first position indicating the current position of the first vehicle; and predicting the traveling path of the first vehicle based on a use ratio of first path information indicating paths of the first vehicle and second path information indicating paths of second vehicles other than the first vehicle among the traveling path information stored in a storage unit, wherein when predicting the traveling path, an amount of the first path information used in the use ratio, which is used to predict the traveling path, is determined based on a past traveling record of the first vehicle at the first position, and the amount of the first path information used the use ratio used for predicting the traveling path becomes higher as the number of traveling times of the first vehicle at a local area corresponding to the first position becomes larger.

* * * * *